(12) United States Patent
Harris

(10) Patent No.: US 8,037,771 B2
(45) Date of Patent: Oct. 18, 2011

(54) ELECTRONIC PRESSURE-SENSING DEVICE

(75) Inventor: Edward B. Harris, Fogelsville, PA (US)

(73) Assignee: LSI Corporation, Milpitas, CA (US)

( * ) Notice: Subject to any disclaimer, the term of this patent is extended or adjusted under 35 U.S.C. 154(b) by 106 days.

(21) Appl. No.: 12/465,309

(22) Filed: May 13, 2009

(65) Prior Publication Data
US 2010/0288048 A1   Nov. 18, 2010

(51) Int. Cl.
*G01L 9/00* (2006.01)
(52) U.S. Cl. .......................................... 73/754
(58) Field of Classification Search .................. None
See application file for complete search history.

(56) References Cited

U.S. PATENT DOCUMENTS

| 5,191,237 | A * | 3/1993 | Takebe ...................... 257/419 |
| 6,550,337 | B1 * | 4/2003 | Wagner et al. ................. 73/715 |
| 6,938,490 | B2 * | 9/2005 | Wagner et al. ................. 73/708 |
| 2002/0095993 | A1 * | 7/2002 | Ferris .......................... 73/753 |
| 2010/0090299 | A1 * | 4/2010 | Chang et al. ................. 257/419 |
| 2010/0186515 | A1 * | 7/2010 | Sakurai et al. ................. 73/702 |

* cited by examiner

*Primary Examiner* — Andre J Allen

(57) ABSTRACT

An electronic pressure-sensing device 100 comprising a transistor 105 located on a substrate 110. The device also comprises a linker arm 115 that has a tip 120 which is configured to touch a contact region 125 of the substrate that is near the transistor. The device also comprises a pressure converter 130 that is mechanically coupled to the linker arm. The pressure converter is configured to cause, in response to a pressure change, the tip to impart a force capable of changing an electrical conductivity of the transistor.

20 Claims, 5 Drawing Sheets

ELECTRONIC PRESSURE-SENSING DEVICE

TECHNICAL FIELD

This application is directed, in general, to pressure-sensing devices, and more specifically, to electronic pressure sensing devices and methods of using and manufacturing such devices.

BACKGROUND

The miniaturization of pressure-sensing devices is desirable because this broadens their application and may reduce their material or manufacturing costs. Miniaturization and reduced costs are hampered, however, because components of pressure-sensing devices typically are separately manufactured and then assembled to form the device.

SUMMARY

One embodiment of the disclosure is an electronic pressure-sensing device. The device comprises a transistor located on a substrate. The device also comprises a linker arm that has a tip which is configured to touch a contact region of the substrate that is near the transistor. The device also comprises a pressure converter that is mechanically coupled to the linker arm. The pressure converter is configured to cause, in response to a pressure change, the tip to impart a force capable of changing an electrical conductivity of the transistor.

Another embodiment of the disclosure provides a method of measuring pressure changes. The method comprises moving a linker arm coupled to a pressure converter in response to the pressure converter being mechanically vibrated by a pressure change in a medium surrounding the pressure converter. The movement causes a tip of the linker arm to impart a force to a contact region of a substrate. The method also comprises applying a voltage across a transistor that is located on the substrate and near the contact region. The method further comprises recording a first voltage or first current from the transistor, the recorded first voltage or first current varying as a function of changes in the imparted force.

Still another embodiment of the disclosure is a method of manufacturing an electronic pressure-sensing device. The method comprises forming a transistor on a substrate and situating a linker arm over the substrate such that a tip of the linker arm can touch a contact region of the substrate near the transistor. The method also comprises coupling the linker arm to a pressure converter such that a pressure change in an environment surrounding the pressure converter can cause the tip to impart a force to the contact region.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

The present disclosure benefits from the recognition that the sensitivity of transistors to external forces can be advantageously used to provide an electronic pressure sensing device. Because externally applied forces affect the conductivity of the transistor (e.g., by increasing or decreasing the mobility of the transistor's carriers), the change in conductivity of the transistor, when the external force is applied, can be used to measure pressure changes in an environmental medium surrounding the transistor.

The electronic pressure-sensing devices and their use disclosed herein are in contrast to electronic devices which are typically designed and packaged to eliminate or minimize the effects of external forces on transistor function. It is generally not desirable for transistors in an electronics device to be sensitive to external forces, because this could cause the electrical characteristics of the transistors and devices to behave differently than originally designed. For instance, variations in the forces applied to transistors during their manufacture (wire-bonding, probing, and packaging) could cause undesired changes in the transistor's electrical properties. To the contrary, the pressure-sensing devices of the present disclosure can include structures that enhance a transistor's sensitivity to pressure changes in its environment.

Figure 1A:
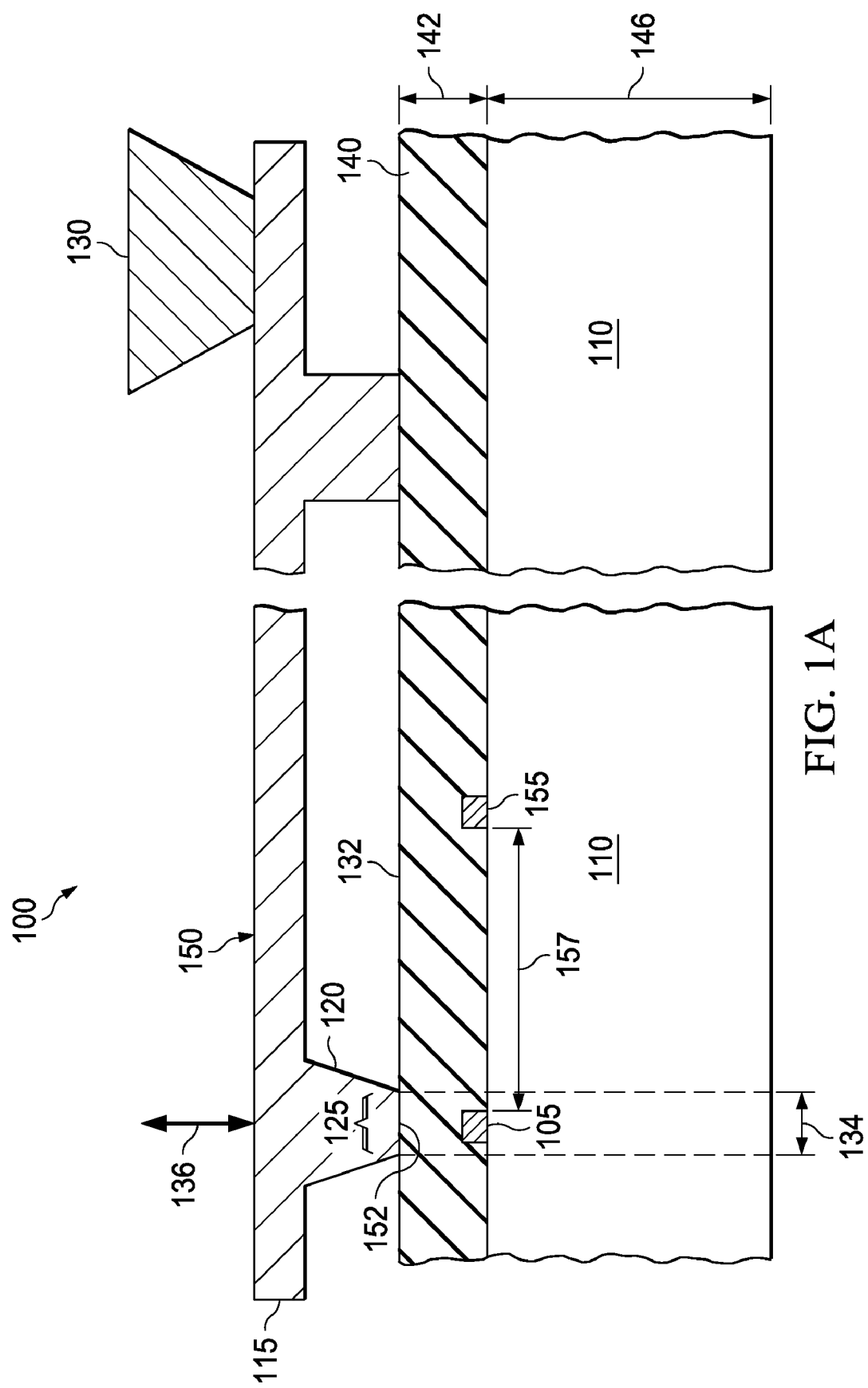
FIGS. 1A-1C present cross-sectional views of portions of example electronic pressure-sensing devices of the disclosure.
Figure 1B:
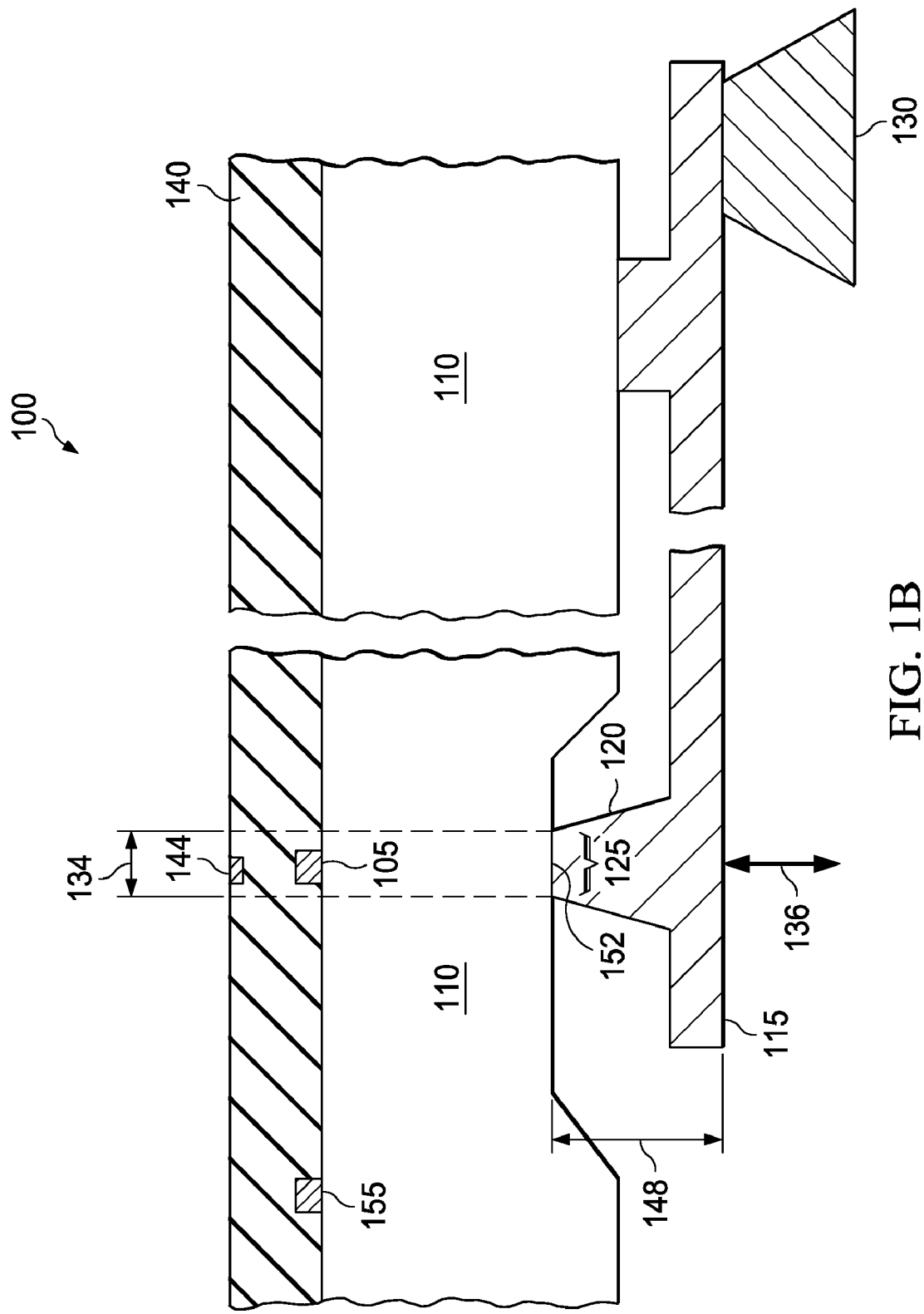
Figure 1C:
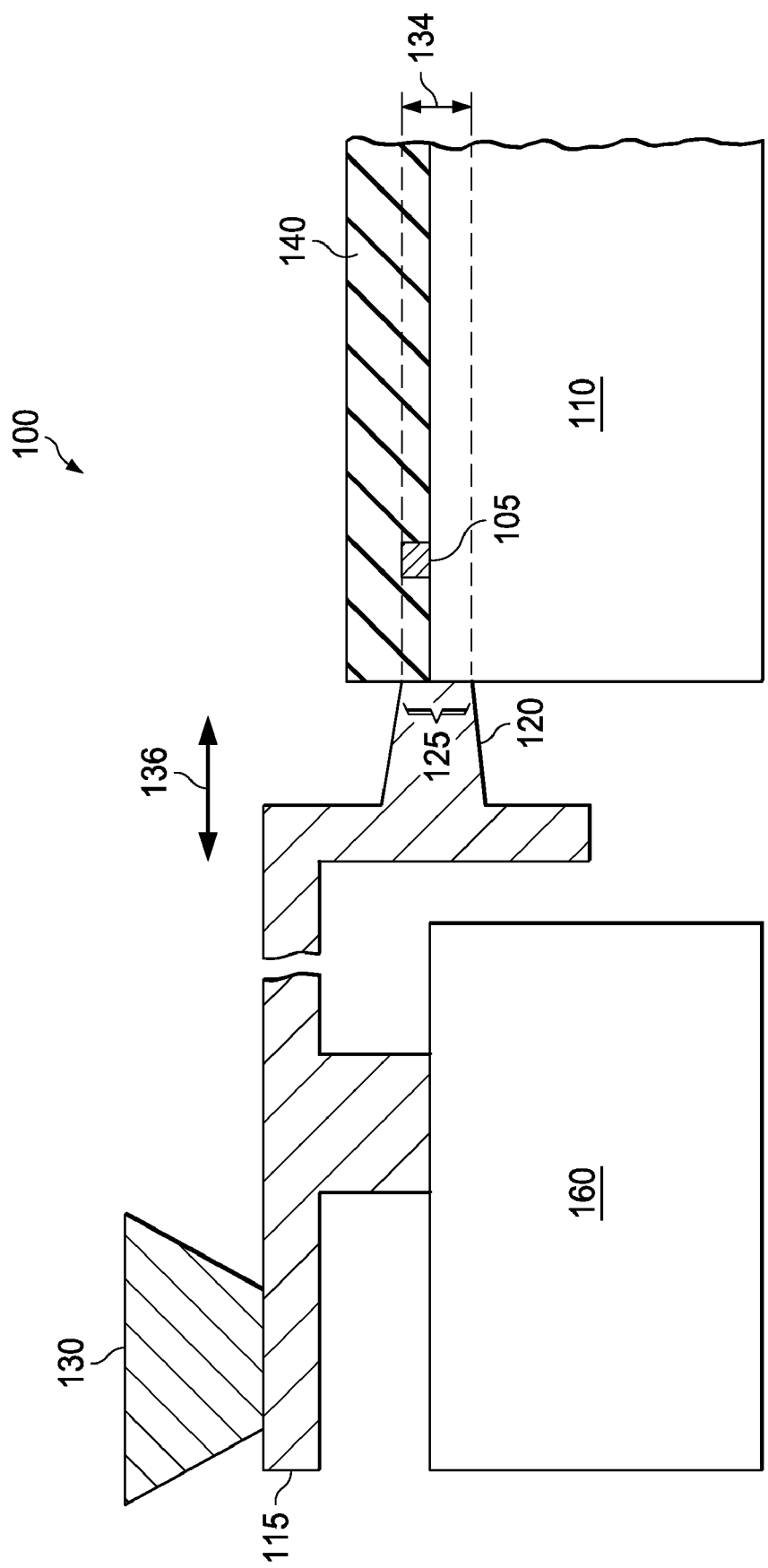

FIGS. 1A-1C presents cross-sectional views of portions of example electronic pressure-sensing device 100 embodiments of the disclosure. The device 100 comprises a transistor 105 located on a semiconductor substrate 110. The device 100 also comprises a linker arm 115 that has a tip 120 which touches a contact region 125 of the substrate 110 near the transistor 105. The device 100 also comprises a pressure converter 130 that is mechanically coupled to the linker arm 115. The pressure converter 130 is configured to cause, in response to a pressure change, the tip 120 to impart a force capable of changing an electrical conductivity of the transistor 105.

The contact region 125 of the substrate 110 is a portion of a side 132 of the substrate 110 that is contacted by the tip 120. For the purposes of the present disclosure, the contact region 125 is considered to be near the transistor 105 when the transistor 105 is within a perimeter 134 of the contact region 125 and along an intended direction 136 of the force imparted from the tip 120.

In some embodiments, such as shown in FIG. 1A, the tip 120 of the linker arm 115 is located over the substrate 110. Situating the tip 120 over the substrate 110 can be conducive to optimizing the device's 100 sensitivity to pressure. For instance, consider when the substrate 110 includes a thin dielectric layer 140 on the transistor 105. E.g., a silicon oxide dielectric layer 140 having a thickness 142 of about 10 to 20 microns. Substantially all of the forces transmitted from the tip 120 reaches the transistor 105 because the thin dielectric layer 140 may not substantially dissipate the force from the tip 120.

In some embodiments, such as shown in FIG. 1B, the tip 120 of the linker arm 115 is located under the substrate 110. Such a configuration can provide the advantage of allowing ready access to the transistor 105. For instance, contacts 144 for connecting the transistor 105 to other devices (not shown)

can be located directly above the transistor 105 in the dielectric layer 140 thereby facilitating short interconnection pathways between the transistor 105 and the contacts 144. Sometimes, however, a device 100 configured such as shown in FIG. 1B may have less sensitivity than the configuration shown in FIG. 1A, because the substrate 110 can dissipate more of the force from the tip 120. For instance, relatively greater dissipation of the force can occur because the substrate 110 is substantially thicker (e.g., silicon thickness 146 of about 200 to 300 microns) than the dielectric layer 140. In some embodiments, however, the substrate's thickness 114 can be reduced to decrease the dissipating effect and thereby increase pressure sensitivity. For instance, as shown in FIG. 1B, a portion of the substrate 110 directly under the transistor 105 can removed to provide a reduced substrate thickness 148 (e.g., about 50 to 100 microns) for the tip 120 to touch.

In still other embodiments, such as shown in FIG. 1C, the tip 120 of the linker arm 115 can be located adjacent to the substrate 110. Such embodiments can have the advantage of providing a device configuration that is more compact in the vertical dimension as compared to the configurations depicted in FIG. 1A or 1B.

For any of the embodiments shown in FIGS. 1A-1C, the linker arm 115 can be made of any solid material and have any shape that is conducive to transmitting the pressure changes registered by the pressure converter 130 to contact region 125. For instance, the linker arm 115 can be made of metal or plastic that can be molded, bent, machined or otherwise shaped to provide a body 150 that couples to the pressure converter 130 to the substrate 110, and, provide a tip 120 that can touch the contact region 125. In some cases, it is preferable to minimize the area of the tip's surface 152 (FIG. 1A) that touches the contact region 125, because this can focus the force imparted from the tip 125. Minimizing the surface's 152 area, however, needs to be balanced with the preference of having the surface 152 centered over the transistor 105, and large enough in area, so as to provide a reproducible amount of force to the transistor 105 for a same unit change in pressure. The desire for reproducibility is applicable within a single device and among different devices, e.g., manufactured in a batch process. In some embodiments, the surface's 152 area ranges from 10 to 100 time large than the area occupied by the transistor 105 on the substrate 110. For instance, consider when the transistor 105 is manufactured at the 40 nm node (e.g., the transistor's 105 gate length is about 40 nm), and thereby occupies an area of about 0.02 microns$^2$. In some embodiments, the surface's 152 area preferably range from about 0.2 to 2 microns$^2$. In other cases, however, larger transistors (e.g., 65 nm node and higher) having more reliable electrical characteristics, may be used. In such cases, a surface 152 area of greater than about 2 microns$^2$ may be desirable.

As shown in FIG. 1A, in some cases, it is preferable to configure the linker arms 115 to have a beveled tip 120. Such a configuration can help focus the force imparted from linker arm 115 onto the contact region 125.

As illustrated in FIGS. 1A-1C, the substrate 100 can include a dielectric layer 140. The dielectric layer 140 can be part of an interconnect structure that includes metal interconnect lines, vias and contacts (not shown) that couple the transistor 105 to other components (not shown) of the device 100. In some embodiments, it is advantageous for the dielectric layer 140 to be or include a strained dielectric layer covering the transistor 105. The strained dielectric layer 140 can be configured to impart a tensile force or a compressive force to the transistor 105. In some embodiments, for example, the strained dielectric layer 140 includes one or more of layers composed of silicon nitride, silicon oxynitride, or silicon oxide.

A strained dielectric layer 140 can change (i.e., increase or decrease) the electrical sensitivity of the transistor 105 with respect to the force imparted from the tip 120 of the linker arm 115. The transistor's 105 sensitivity can be assessed by measuring the change in the transistor's drain current for a given applied gate voltage and force imparted by the tip 120, as compared to an equivalent transistor with an unstrained dielectric layer.

Whether the strained dielectric layer 140 increases or decreases the transistor's 105 sensitivity to the force imparted by the tip 120, as compared to an equivalent unstrained transistor, depends on the type of strain applied by the dielectric layer 140, and, the type of transistor 105 in the device 100. A strained dielectric layer 140 that applies a compressive force along direction 136 to an n-type metal oxide semiconductor (nMOS) transistor 105 can increase the transistor's 105 sensitivity. That is, the conductivity of the nMOS transistor 105 (e.g., as reflected by the drain current for a given applied gate voltage) changes to a greater extent in response to the force imparted from the tip 120, as compared to an equivalent nMOS transistor 105 covered by an unstrained dielectric layer 140 and receiving the same imparted force. A strained dielectric layer 140 applying a tensile force along direction 136 to an nMOS transistor 105 can decrease the transistor's 105 sensitivity. That is, the conductivity of the nMOS transistor 105 changes to a lesser extent in response to the force imparted from the tip 120, as compared to an equivalent nMOS transistor 105 covered by an unstrained dielectric layer 140 and receiving the same imparted force.

In comparision, a strained dielectric layer 140 that applies a compressive force along direction 136 to a p-type metal oxide semiconductor (pMOS) transistor 105 can decrease the transistor's 105 sensitivity. That is, the conductivity of the PMOS transistor 105 changes to a lesser extent in response to the force imparted from the tip 120, as compared to an equivalent pMOS transistor 105 covered by an unstrained dielectric layer 140 and receiving the same imparted force. A strained dielectric layer 140 that applies a tensile force along direction 135 to a pMOS transistor 105 can increase the transistor's 105 sensitivity. That is, the conductivity of the pMOS transistor 105 changes to a greater extent in response to the force imparted from the tip 120, as compared to an equivalent pMOS transistor 105 covered by an unstrained dielectric layer 140 and receiving the same imparted force.

The use of a strained dielectric layer to increase the sensitivity of a transistor to externally applied forces is contrary to certain conventional integrated circuit (IC) designs, which often try to minimize the transistor's sensitivity to externally applied forces. Minimal sensitivity to external force is often sought, so as to avoid steps in the manufacture of the IC having undesired effects on the electrical properties of the transistors in the IC, and thereby causing lower yields of ICs that function within acceptable ranges.

As further illustrated in FIG. 1A, in some embodiments, the device 100 can further include a reference transistor 155 located on the substrate 110. A separation distance 157 between the reference transistor 155 and the transistor 105 is sufficient that the force imparted from the tip 120 does not substantially change the electrical conductivity of the reference transistor 155. For instance, in some embodiments, the transistor 105 and the reference transistor 155 are separated by a distance 157 that is at least about 5 times greater that the square-root of the area of the tip surface 152 that touches the contact region 125 of the substrate 110. For example when the area of the tip surface 152 equals about 2 microns$^2$, the separation distance is about 10 microns.

For similar reasons, it can also be desirable for the reference transistor 155 to be situated such that it is outside of the perimeter 134 of the contact region 125 and not along the intended direction 136 of the force imparted from the tip 120. For instance, for embodiments such as shown in FIG. 1C the reference transistor is not depicted because the direction 136 of the force from tip 120 travels laterally across the substrate 110 and therefore could affect a reference transistor 155 located within the cross-sectional depicted in the figure. Rather, it would be preferable for the reference transistor to be located either inside or outside of the cross-section depicted in FIG. 1C.

In some embodiments, the transistor 105 and the reference transistor 155 are both either pMOS transistors or nMOS transistors. This can facilitate having the electrical properties of the transistors 105, 155 well-matched to each other, which it turn, makes in easier to detect differences the electrical responses of the transistors 105, 155 when a force is applied from the tip 120. In other cases, however, one of the transistors 105, 155, can be one of a PMOS or nMOS transistor, and the other transistor 155, 105 can be the other of an nMOS or pMOS transistor. In still other cases, one or both of the transistors 105, 155 can be a bipolar transistor or other type of transistor. Although the example embodiments discussed herein describe the presence of one transistor 105 and one reference transistor 155, one skilled in the art would appreciate that multiple transistors could be situated within the perimeter 134 of the contact region 125, or, used as reference transistors, if desired.

In some embodiments, the transistor 105 and the reference transistor 155 are both covered with a strained dielectric layer 140. The strained dielectric layer 140 is configured to impart one of a tensile force or a compressive force to the transistor 105 and the reference transistor 155. Such embodiments benefit from the lower expense and simpler process of depositing a single dielectric layer 140 on the transistors 105, 155. Additionally because they have the same dielectric layer 140 thereon, the transistors 105, 155 can have the same electrically properties, which can be useful when they are incorporated to certain types of differential amplifier circuit.

In other cases, however, suitable masking and deposition processes can be used to provide a only a strained dielectric layer on the transistor 105, and only an unstrained dielectric layer on the reference transistor 155. This can be beneficial when the force imparted from the tip 120 would otherwise have a substantial affect on the electrical properties of the reference transistor, e.g., even if the reference transistor 155 is remote from the contact region 123.

As also illustrated in FIG. 1A, in some embodiments the pressure converter 130 is attached to a same side 132 of substrate 110 that the tip 120 touches. For example, the device 100 can be configured as an audio device, such as a microphone, a recording device, a telephone, or combination thereof, or a pressure transducer. In some cases, the pressure converter 130 can be include, or be, a diaphragm that is attached to the body 150 of the linker arm 115, which in turn, is attached to the substrate 110. In other cases, however, the pressure converter 130 can be directly attached to the side 132 of the substrate 110. The diaphragm pressure converter 130 can be configured to move in response to a pressure change such that a mechanical force is imparted through the body 150 to the tip 120, thereby causing the tip 120 to impart a force, in direction 136, to the contact region 125. For instance, the diaphragm pressure converter 130 can mechanically vibrate in response to a sound wave traveling through a medium that the device 100 or the pressure converter 130 is in (e.g., air, liquid or solid), and, these mechanical vibrations can be imparted to the tip 120 of the linker arm 115.

In still other embodiments, however, one or both of the linker arm 115 or the pressure converter 130 are not attached to the substrate 110. For instance, as shown in FIG. 1C, the pressure converter 130 and linker arm 115 can be separately attached to a second substrate 160 and situated adjacent to the substrate 110.

Figure 2:
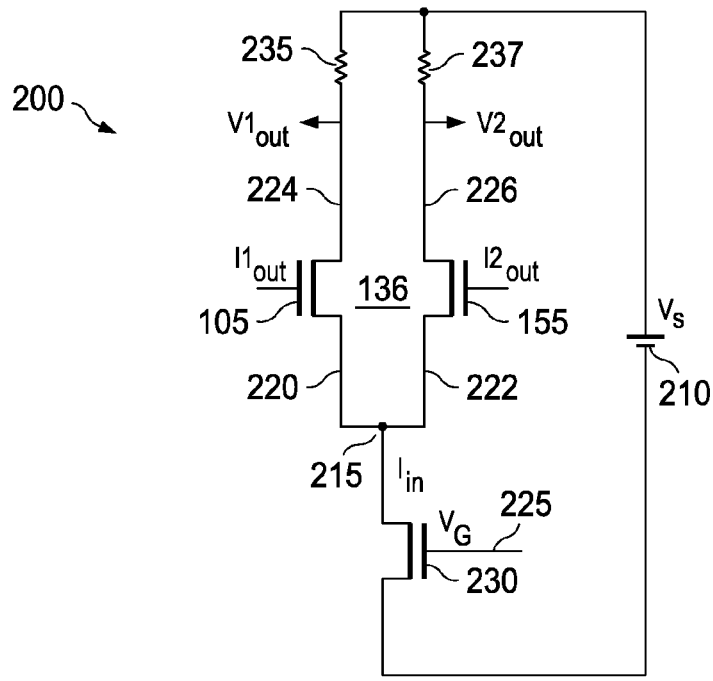
FIG. 2 presents an example differential amplifier electrical circuit of an electronic pressure-sensing device of the disclosure, such as the devices presented in FIGS. 1A-1C.

In some embodiments, the transistor 105 and reference transistor 155 are both part of a differential amplifier electrical circuit of the device 100. FIG. 2 presents an example differential amplifier electrical circuit 200 of an electronic pressure-sensing device of the disclosure, such as the devices 100 presented in FIGS. 1A-1C. As illustrated in FIG. 2, the transistor 105 and reference transistor 155 can be coupled to a common voltage source 210 (e.g., by applying a voltage, $V_s$) via a common nodal point 215. For instance, the source electrodes 220, 222 of both transistors 105, 155 can be coupled to the common nodal point 215. An input current ($I_{in}$) is split between the transistors 105, 155. When the transistors 105, 155 are electrically equal they each carry half of $I_{in}$. When the force from the tip 120 (FIG. 1) is applied to one transistor 105 but not the other transistor 155, then one of the transistors (e.g., either transistor 105 or reference transistor 155) will be more conductive and therefore carry more of the current. The difference in first and second currents ($I1_{out}$, $I2_{out}$) being carried, in turn, will cause different first and second voltages ($V1_{out}$, $V2_{out}$) on the drain electrodes 224, 226 of the transistors 105, 155.

One skilled in the art would be familiar with additional components that could be included to complete the circuit 200. For instance, as shown in FIG. 2, the circuit 200 can further include a third transistor 230. The third transistor 230 can be used to control the $I_{in}$ to the transistors 105, 155, e.g., by adjusting a voltage ($V_G$) applied to the gate 225 of the third transistor 220. The circuit 200 can also include resistors 235, 237 that are coupled to the drain electrodes 224, 226 of the transistors 105, 155. In other embodiments, additional transistors could be used, instead of or in addition to, the resistors 235, 237, to bear the current load.

Figure 3:
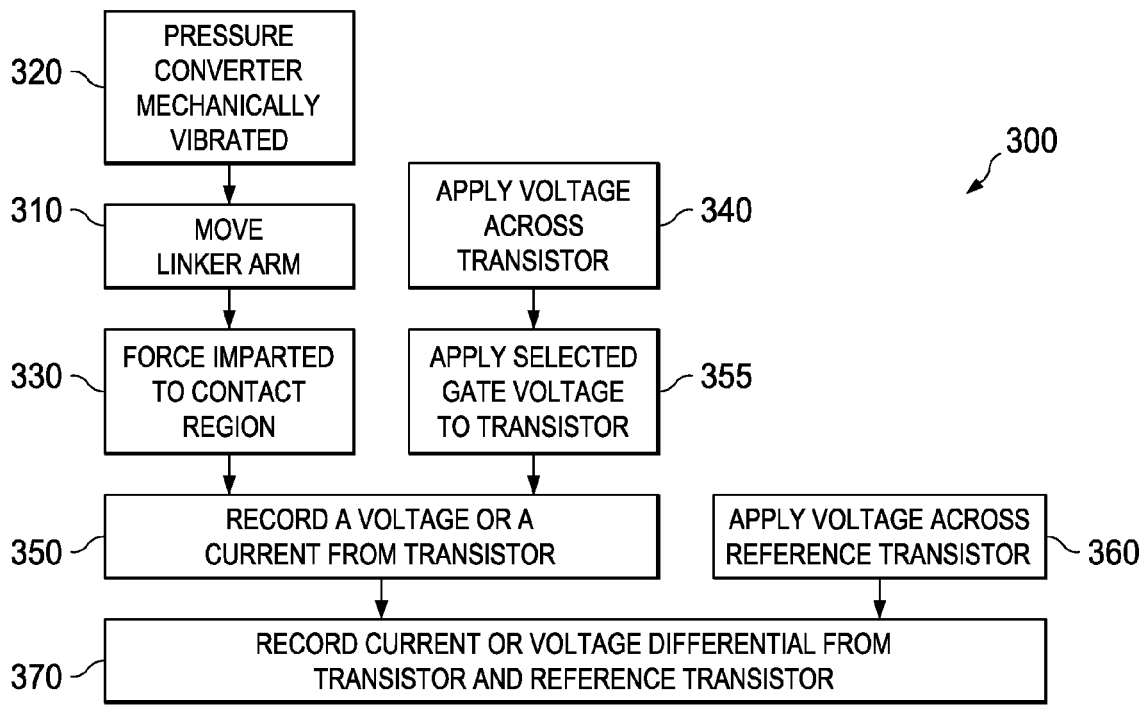
FIG. 3 presents a flow diagram of an example method of measuring pressure changes in accordance with the disclosure.

FIG. 3 presents a flow diagram of another embodiment of the disclosure, a method 300 of measuring pressure changes. Any of the embodiments of the device 100, such as discussed above in the context of FIGS. 1A-2, can be used in performing the method 300.

With continuing reference to FIGS. 1A-2 throughout, the method 300 comprises a step 310 of moving the linker arm 115 coupled to a pressure converter 130. The movement of the linker arm 115 in step 310 is in response to the pressure converter 130 being mechanically vibrated (step 320) by a pressure change in the medium surrounding the pressure converter. The movement of the linker arm 115 causes its tip 120 to exert a change in a force (step 330) imparted to the contact region 125 of the substrate 110. The method 300 also comprises a step 340 of applying a voltage $V_s$ across a transistor 105 located on the substrate 110 and near the contact region 125. The method 300 further comprises recording, in step 350, a first voltage ($V1_{out}$) from the transistor 105 that varies as a function of changes in the imparted force. Based on the disclosure one of ordinary skill in the art would appreciate how the circuit 200 (FIG. 2) could be altered so as to alternatively record, in step 350, a first current ($I1_{out}$) from the transistor 105 that varies as a function of changes in the imparted force.

In some embodiments, it is desirable to apply, in step 355, a selected gate voltage ($V_G$) to the transistor 105 because this can cause a greater change in $I1_{out}$ for a given imparted force as compared to other $V_G$ values. For example, in some embodiments, when $V_G$ is applied (step 350) in a range from about 0.01 to 0.4 Volts, the $I1_{out}$ can change (e.g., increase for an nMOS transistor 105) by about 15 percent or more when a force is applied from the tip 120 (e.g., about $1 \times 10^{-4}$ N or greater), as compared to when no force is applied. In some preferred embodiments, $V_G$ applied in step 350 is about 0.01 to 0.15 Volts, which can facilitate a change in $I1_{out}$ of about 30 percent or more when the force from the tip 120 is applied.

In some embodiments, the method 300 further includes a step 360, of applying the same voltage ($V_s$) to the reference transistor 155 located on the substrate 110. As discussed in the context of FIG. 2, the reference transistor 155 can have a common input node 215 with the transistor 105. In some case, because the reference transistor is separated from the contact region 125, a second voltage ($V2_{out}$) from the reference transistor 155 does not substantially vary in response to changes in the imparted force from the tip 120. The presence of the reference transistor can facilitate the detection of changes in electrical response of the transistor 105. For instance, in step 370, a difference in the voltages from the transistor 105 and the reference transistor 155 (e.g., $V1_{out}$-$V2_{out}$) can be recorded, the voltage differential varying as a function of changes in the imparted force. Based on the disclosure, one of ordinary skill in the art would appreciate how an alternative circuit 200 (FIG. 2) could used to record in step 370 a difference in first and second currents from the transistor 105 and the reference transistor 155 (e.g., $I1_{out}$-$I2_{out}$). One skilled in the art would understand how to perform suitable steps to convert the recorded voltage or current, or, voltage or current differentials of steps 350 or 370, respectively, into stored information or otherwise useful information for an end-user.

Figure 4:
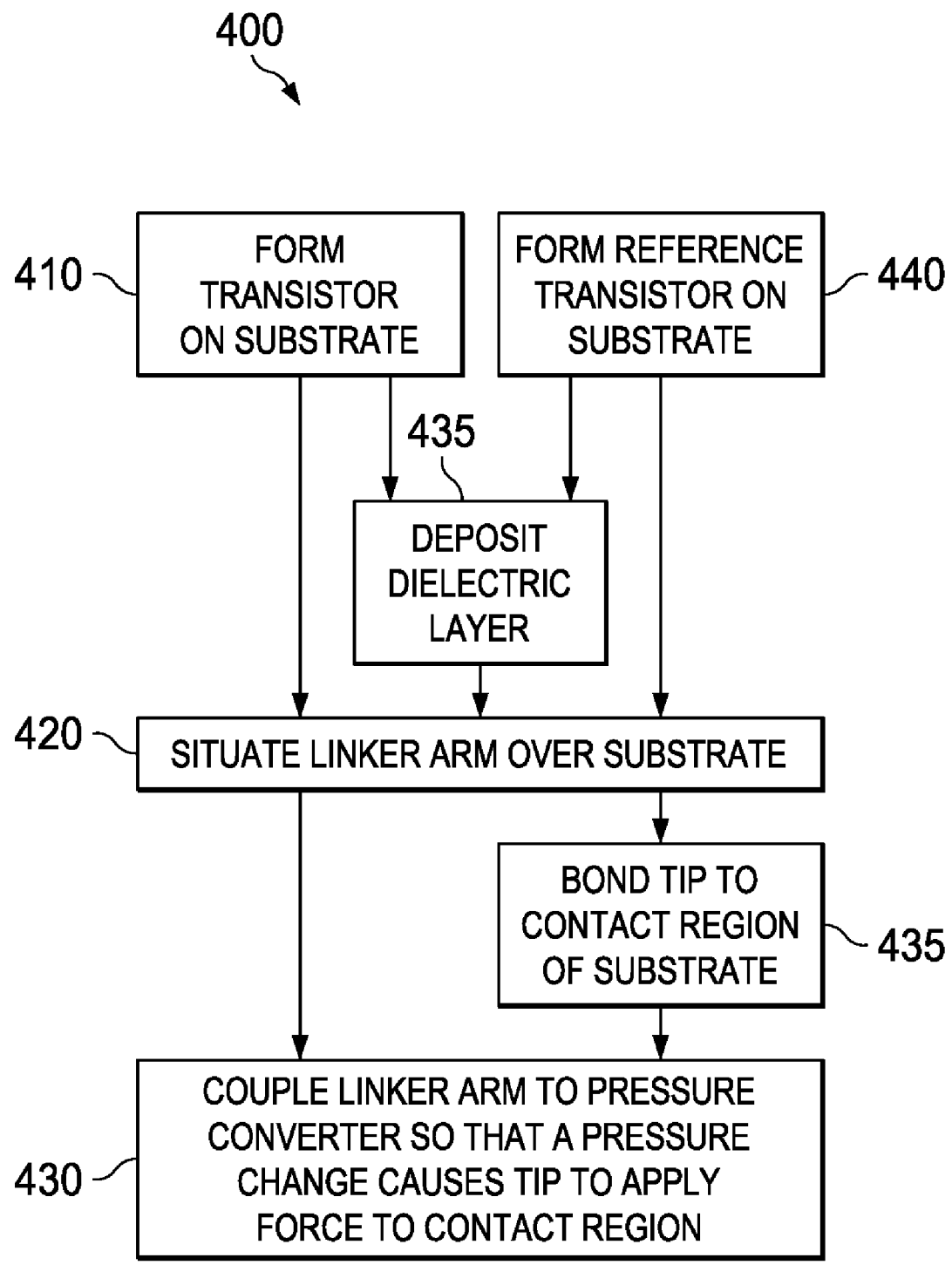
FIG. 4 presents a flow diagram of an example method of manufacturing an electronic pressure-sensing device in accordance with the disclosure.

Still another embodiment of the disclosure is a method for manufacturing an electronic pressure-sensing device. Any of the embodiments of devices 100 discussed in the context of FIG. 1A-3 can be manufactured by the method. FIG. 4 presents a flow diagram of an example method 400 of fabricating an electronic pressure-sensing device in accordance with the disclosure.

Again, with continuing reference to FIGS. 1A-2 throughout, the method 400 comprises a step 410 of forming a transistor 105 on a substrate 110. The method 400 also comprises a step 420 of situating a linker arm 115 over the substrate 110 such that the tip 120 of the linker arm 115 can touch a contact region 125 of the substrate 110, the contact region 125 being near the transistor 105. The method 400 further comprises a step 430 of coupling the linker arm 115 to a pressure converter 130 such that a pressure change in a medium surrounding the pressure converter 130 can cause the tip 120 to impart a force to the contact region 125.

In some cases, forming the transistor 105 on the substrate 110 in step 410 can include fabricating the transistor 105 in or on a semiconductor substrate 110, such as a silicon wafer substrate, using photolithographic patterning, dopant implantation, etching, and other conventional semiconductor processing techniques. One skilled in the art would be familiar with the processes to form, part of step 410, nMOS, pMOS or other transistor types. In other cases, however, forming the transistor 105 on the substrate 110 in step 410 can include mounting a prefabricated IC that includes the transistor 105 to a printed circuit board substrate 110.

In some embodiments, forming the transistor 105 on the substrate 110 in step 410 can include a step 435 of depositing a dielectric layer 140 on the substrate 105 such that the transistor 105 is covered by the dielectric layer 140. In some cases the dielectric layer 140 deposited in step 435 is a strained dielectric layer. The strained dielectric layer 140 is configured to impart one of a tensile force or a compressive force to the transistor 105. One skilled in the art would be familiar with methods to deposit unstrained or strained dielectric layers 140, e.g., as part of a semiconductor transistor front-end fabrication process flow. For instance, in some cases where the transistor 105 is an nMOS transistor a strained silicon nitride dielectric layer 140 can be deposited on a silicon substrate, such that one of a compressive force or a tensile force is applied to the transistor 105. I In some embodiments, the method 400 can further include a step 440 of forming a reference transistor 155 on the substrate 110. The reference transistor 155 is preferably formed at a location on the substrate 110 that is a sufficient distance 157 separated from the transistor 105 that the force to be imparted from the linker arm's 115 tip 120 would not substantially change the electrical conductivity of the reference transistor 155. In some cases, the step 440 of forming the reference transistor 155 is part of the same semiconductor transistor front-end fabrication process flow used to form the transistor 105 in step 410. In such cases, the dielectric layer 140 (e.g., a strained dielectric layer) deposited in step 435 can also cover the reference transistor 155. In other cases, however, a separate dielectric layer (e.g., an unstrained dielectric layer) deposition step 445 can be performed to cover the reference transistor 155. In yet other cases, forming the reference transistor 155 on the substrate 110 in step 440 can include mounting a prefabricated second IC, that includes the reference transistor 155, to the same printed circuit board substrate 110 that the transistor 105 (e.g., in an IC) is mounted to.

In some cases the linker arm 115 and pressure converter 130 are prefabricated components that are situated and coupled, in accordance with steps 420 and 430, respectively. Alternatively, one skilled in the art would be familiar with processes to mold, bend, or machine the linker arm 115 into the appropriate shape from metal, plastic or similar materials, and, with the procedures to manufacture pressure converters 130, such as diaphragms or other types of pressure-sensitive structures.

In some cases, the step 420 of situating the linker arm 120 over the substrate 110 can further include a step 450 of bonding the tip 120 to the contact region 125. For example the tip 120 can be bonded using adhesive materials such as epoxy or solder. Having the tip 120 bonded to the contact region 125 can help avoid propagating harmonic vibrations through the substrate 110. Harmonic vibrations might occur if the tip 120 were to hit the substrate 110 from a position separated from and above the substrate 110 as part of imparting the force. Such harmonic vibrations could interfere with the accurate conversion of the pressure changes received by the pressure converter 130 into changes in electrical conductivity in the transistor 105.

Although some embodiments of the disclosure have been described in detail, those of ordinary skill in the art should understand that they could make various changes, substitutions and alterations herein without departing from the scope of the disclosure.

What is claimed is:

1. An electronic pressure-sensing device, comprising:
   a transistor located on a substrate;
   a linker arm having a tip, said tip configured to touch a contact region of said substrate that is near said transistor; and
   a pressure converter mechanically coupled to said linker arm, said pressure converter configured to cause, in response to a pressure change, said tip to impart a force to change an electrical conductivity of said transistor.

2. The device of claim 1, wherein said tip of said linker arm is located over said substrate.

3. The device of claim 1, wherein said tip of said linker arm is under said substrate.

4. The device of claim 1, wherein said tip of said linker arm is located adjacent to said substrate.

5. The device of claim 1, wherein a side of said tip contacting said substrate has a surface area in a range of about 1 to 2 microns$^2$.

6. The device of claim 1, wherein said tip is a beveled tip.

7. The device of claim 1, wherein said substrate further includes a strained dielectric layer covering said transistor, said strained dielectric layer configured to impart a tensile force or a compressive force to said transistor.

8. The device of claim 7, wherein said strained dielectric layer includes one or more of silicon nitride, silicon oxynitride, or silicon oxide.

9. The device of claim 1, further including a reference transistor located on said substrate, wherein a separation distance between said reference transistor and said transistor is sufficient that said force does not substantially change an electrical conductivity of said reference transistor.

10. The device of claim 9, wherein said transistor and said reference transistor are separated by a distance that is at least about 5 times greater that the square-root of the area of a surface of said tip that touches said contact region.

11. The device of claim 10, wherein said area is about 2 microns$^2$ and said separation distance is about 10 microns.

12. The device of claim 9, wherein said transistor and said reference transistors are either both pMOS transistors or both nMOS transistors.

13. The device of claim 9, wherein both of said transistor and said reference transistor are covered with a strained dielectric layer that is configured to impart one of a tensile force or a compressive force to said transistor and to said reference transistor.

14. The device of claim 9, wherein said transistor is covered with a strained dielectric layer that is configured to impart one of a tensile force or a compressive force to said transistor and to said reference transistor and said reference transistor is covered with an unstrained dielectric layer.

15. The device of claim 1, wherein said pressure converter is attached to a same side of said substrate that said tip touches.

16. The device of claim 1, wherein said pressure converter includes a diaphragm and said device is configured as an audio device or a pressure transducer.

17. The device of claim 9, wherein said transistor and said reference transistor are part of a differential amplifier electrical circuit.

18. A method of measuring pressure changes, comprising:
moving a linker arm coupled to a pressure converter in response to said pressure converter being mechanically vibrated by a pressure change in a medium surrounding said pressure converter, wherein said movement causes a tip of said linker arm to impart a force a contact region of a substrate;
applying a voltage across a transistor located on said substrate and near said contact region; and
recording a first voltage or a first current from said transistor, said first voltage or said first current varying as a function of changes in said imparted force.

19. The method of claim 18, further including:
applying said voltage to a reference transistor located on said substrate, said reference transistor having a common input node with said transistor, wherein a second voltage or a second current from said reference transistor does not substantially vary in response to said magnitude of said changing imparted force; and
calculating a difference between said first voltage and said second voltage, or, between said first current and said second current, said difference varying as a function of changes in said imparted force.

20. A method of manufacturing an electronic pressure-sensing device, comprising:
forming a transistor on a substrate;
situating a linker arm over said substrate such that a tip of said linker arm can touch a contact region of said substrate near said transistor; and
coupling said linker arm to a pressure converter, said pressure converter configured to cause said tip to impart a force to said contact region in response to a pressure change in a medium surrounding said pressure converter.

* * * * *